(12) United States Patent
Madurai Kumar et al.

(10) Patent No.: US 8,473,177 B2
(45) Date of Patent: Jun. 25, 2013

(54) APPARATUSES, METHODS, AND SYSTEMS FOR THERMAL MANAGEMENT OF HYBRID VEHICLE SCR AFTERTREATMENT

(75) Inventors: Mahesh Madurai Kumar, Columbus, IN (US); Morgan M. Andreae, Columbus, IN (US); Neal W. Currier, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 0 days.

(21) Appl. No.: 13/209,874

(22) Filed: Aug. 15, 2011

(65) Prior Publication Data

US 2012/0173062 A1 Jul. 5, 2012

Related U.S. Application Data

(63) Continuation of application No. 12/982,963, filed on Dec. 31, 2010, now abandoned.

(51) Int. Cl.
*F01N 3/00* (2006.01)
(52) U.S. Cl.
USPC ........... 701/101; 110/344; 110/345; 422/168; 422/169; 422/172; 422/173; 422/174; 423/213.2; 423/213.5; 60/273; 60/274; 60/276; 60/286; 60/300; 60/303; 73/114.75
(58) Field of Classification Search
USPC .................. 110/344, 345; 422/168, 169, 171, 422/172, 173, 174, 177; 423/213.2, 231.5; 60/273, 274, 276, 286, 300, 303; 701/101, 701/102, 103; 73/114.75
See application file for complete search history.

(56) References Cited

U.S. PATENT DOCUMENTS

| | | | |
|---|---|---|---|
| 3,566,717 A | 3/1971 | Berman et al. | |
| 3,732,751 A | 5/1973 | Berman et al. | |
| 3,923,115 A | 12/1975 | Helling | |
| 4,021,677 A | 5/1977 | Rosen et al. | |
| 4,099,589 A | 7/1978 | Williams | |
| 4,165,795 A | 8/1979 | Lynch et al. | |
| 4,233,858 A | 11/1980 | Rowlett | |
| 4,305,254 A | 12/1981 | Kawakatsu et al. | |

(Continued)

FOREIGN PATENT DOCUMENTS

JP 58098658 6/1983
JP 2007032494 2/2007

OTHER PUBLICATIONS

Notification of Transmittal of the International Search Report and the Written Opinion of the International Searching Authority, or the Declaration, International Application No. PCT/US2011/067677, Apr. 25, 2012, 10 pages.

*Primary Examiner* — Thomas Black
*Assistant Examiner* — Peter D Nolan
(74) *Attorney, Agent, or Firm* — Krieg DeVault LLP

(57) ABSTRACT

Some exemplary embodiments include hybrid vehicle systems including an engine operable to output exhaust, an exhaust aftertreatment system configured to receive the exhaust from the engine, the exhaust aftertreatment system including an SCR catalyst operable to reduce NOx in the exhaust and an electrical heater operable to heat the SCR catalyst, a motor/generator operable in a braking mode to receive torque to slow the vehicle and output electrical power, an energy storage device operable to output electrical power to drive the motor/generator and receive electrical power from the motor/generator, and a controller operable to control the electrical heater to heat the SCR catalyst using electrical power from the motor/generator in the braking mode.

20 Claims, 6 Drawing Sheets

U.S. PATENT DOCUMENTS

| | | | |
|---|---|---|---|
| 4,335,429 A | 6/1982 | Kawakatsu | |
| 4,405,029 A | 9/1983 | Hunt | |
| 4,407,132 A | 10/1983 | Kawakatsu et al. | |
| 4,438,342 A | 3/1984 | Kenyon | |
| 4,489,242 A | 12/1984 | Worst | |
| 4,588,040 A | 5/1986 | Albright, Jr. et al. | |
| 5,251,588 A | 10/1993 | Tsujii et al. | |
| 5,255,733 A | 10/1993 | King | |
| 5,291,960 A | 3/1994 | Brandenburg et al. | |
| 5,323,868 A * | 6/1994 | Kawashima | 180/65.245 |
| 5,327,992 A | 7/1994 | Boll | |
| 5,358,317 A | 10/1994 | Cikanek | |
| 5,403,244 A | 4/1995 | Tankersley et al. | |
| 5,428,274 A | 6/1995 | Furutani et al. | |
| 5,433,282 A | 7/1995 | Moroto et al. | |
| 5,441,122 A * | 8/1995 | Yoshida | 180/65.245 |
| 5,492,189 A | 2/1996 | Kriegler et al. | |
| 5,492,190 A | 2/1996 | Yoshida | |
| 5,513,719 A | 5/1996 | Moroto et al. | |
| 5,531,285 A | 7/1996 | Green | |
| 5,558,173 A | 9/1996 | Sherman | |
| 5,558,595 A | 9/1996 | Schmidt et al. | |
| 5,562,565 A | 10/1996 | Moroto et al. | |
| 5,635,805 A | 6/1997 | Ibaraki et al. | |
| 5,643,119 A | 7/1997 | Yamaguchi et al. | |
| 5,650,931 A | 7/1997 | Nii | |
| 5,713,425 A | 2/1998 | Buschhaus et al. | |
| 5,722,502 A | 3/1998 | Kubo | |
| 5,755,303 A | 5/1998 | Yamamoto et al. | |
| 5,762,156 A | 6/1998 | Bates et al. | |
| 5,775,449 A | 7/1998 | Moroto et al. | |
| 5,778,326 A | 7/1998 | Moroto et al. | |
| 5,788,006 A | 8/1998 | Yamaguchi | |
| 5,789,881 A | 8/1998 | Egami et al. | |
| 5,832,396 A | 11/1998 | Moroto et al. | |
| 5,845,731 A | 12/1998 | Buglione et al. | |
| 5,846,155 A | 12/1998 | Taniguchi et al. | |
| 5,864,771 A | 1/1999 | Yokoyama et al. | |
| 5,865,263 A | 2/1999 | Yamaguchi et al. | |
| 5,892,346 A | 4/1999 | Moroto et al. | |
| 5,908,077 A | 6/1999 | Moore | |
| 5,924,406 A | 7/1999 | Kinugasa et al. | |
| 5,971,092 A | 10/1999 | Walker | |
| 6,009,365 A | 12/1999 | Takahara et al. | |
| 6,018,694 A | 1/2000 | Egami et al. | |
| 6,019,699 A | 2/2000 | Hoshiya et al. | |
| 6,026,921 A | 2/2000 | Aoyama et al. | |
| 6,032,869 A | 3/2000 | Ito et al. | |
| 6,057,605 A * | 5/2000 | Bourne et al. | 290/40 C |
| 6,070,650 A | 6/2000 | Inoue et al. | |
| 6,223,842 B1 | 5/2001 | Masaki | |
| 6,223,846 B1 | 5/2001 | Schechter | |
| 6,232,748 B1 | 5/2001 | Kinoshita | |
| 6,251,042 B1 | 6/2001 | Peterson et al. | |
| 6,300,858 B1 | 10/2001 | Kalapodis et al. | |
| 6,334,079 B1 | 12/2001 | Matsubara et al. | |
| 6,362,535 B1 * | 3/2002 | Tilyou et al. | 290/40 C |
| 6,374,780 B1 | 4/2002 | Rutyna et al. | |
| 6,404,636 B1 | 6/2002 | Staggers et al. | |
| 6,452,286 B1 | 9/2002 | Kubo et al. | |
| 6,464,028 B1 | 10/2002 | Imani | |
| 6,487,477 B1 | 11/2002 | Woestman et al. | |
| 6,501,190 B1 | 12/2002 | Seguchi et al. | |
| 6,515,872 B2 | 2/2003 | Nakayama et al. | |
| 6,570,749 B1 | 5/2003 | Ling et al. | |
| 6,573,687 B2 | 6/2003 | Kimura et al. | |
| 6,595,307 B2 * | 7/2003 | Suzuki | 180/65.235 |
| 6,598,496 B2 | 7/2003 | Pannell | |
| 6,647,961 B2 | 11/2003 | Suzuki et al. | |
| 6,668,953 B1 | 12/2003 | Reik et al. | |
| 6,725,679 B2 | 4/2004 | Honda et al. | |
| 6,807,931 B2 | 10/2004 | Taylor et al. | |
| 6,863,139 B2 | 3/2005 | Egami et al. | |
| 6,871,489 B2 | 3/2005 | Tumati et al. | |
| 6,887,180 B2 | 5/2005 | Pels et al. | |
| 6,901,751 B2 | 6/2005 | Bunting et al. | |
| 6,915,629 B2 * | 7/2005 | Szymkowicz | 60/289 |
| 6,928,807 B2 | 8/2005 | Jacob et al. | |
| 7,024,858 B2 | 4/2006 | Gray Jr. | |
| 7,028,793 B2 | 4/2006 | Hu et al. | |
| 7,104,920 B2 | 9/2006 | Beaty et al. | |
| 7,114,585 B2 | 10/2006 | Man et al. | |
| 7,119,454 B1 | 10/2006 | Chiao | |
| 7,188,020 B2 | 3/2007 | Yasui et al. | |
| 7,267,191 B2 * | 9/2007 | Xu et al. | 180/65.245 |
| 7,276,815 B2 | 10/2007 | Algrain et al. | |
| 7,301,304 B2 * | 11/2007 | Weisgerber et al. | 320/132 |
| 7,303,504 B2 | 12/2007 | Uchisasai et al. | |
| 7,360,615 B2 | 4/2008 | Salman et al. | |
| 7,370,612 B2 | 5/2008 | Hanai | |
| 7,391,129 B2 | 6/2008 | Chiao et al. | |
| 7,392,871 B2 | 7/2008 | Severinsky et al. | |
| 7,411,312 B2 | 8/2008 | Chiao | |
| 7,448,458 B2 | 11/2008 | Meyer | |
| 7,449,891 B2 * | 11/2008 | Cawthorne | 324/427 |
| 7,455,134 B2 | 11/2008 | Severinsky et al. | |
| 7,492,055 B2 | 2/2009 | Chiao | |
| 7,520,353 B2 | 4/2009 | Severinsky et al. | |
| 7,564,213 B2 * | 7/2009 | Bockelmann et al. | 320/104 |
| 7,568,539 B2 | 8/2009 | Abe et al. | |
| 7,572,201 B2 | 8/2009 | Supina et al. | |
| 7,578,363 B2 | 8/2009 | Kim | |
| 7,582,034 B2 | 9/2009 | Usoro | |
| 7,582,980 B2 | 9/2009 | Motoike et al. | |
| 7,714,736 B2 * | 5/2010 | Gielniak | 340/636.1 |
| 7,847,557 B2 * | 12/2010 | Yun et al. | 324/430 |
| 8,091,663 B2 * | 1/2012 | Ichikawa | 180/65.265 |
| 2003/0116368 A1 | 6/2003 | Winkelman et al. | |
| 2006/0101809 A1 * | 5/2006 | Bodo et al. | 60/286 |
| 2006/0174608 A1 | 8/2006 | Hu et al. | |
| 2007/0112475 A1 | 5/2007 | Koebler et al. | |
| 2007/0204594 A1 * | 9/2007 | Ishii | 60/274 |
| 2007/0225888 A1 | 9/2007 | Morris | |
| 2007/0245737 A1 | 10/2007 | Inaba et al. | |
| 2007/0289291 A1 | 12/2007 | Rabinovich et al. | |
| 2008/0039263 A1 | 2/2008 | Usoro | |
| 2008/0051242 A1 | 2/2008 | Usoro | |
| 2008/0099256 A1 | 5/2008 | Holmes et al. | |
| 2008/0103679 A1 | 5/2008 | Ruiz | |
| 2008/0224663 A1 * | 9/2008 | Mack | 320/132 |
| 2008/0233469 A1 * | 9/2008 | Drozdz et al. | 429/61 |
| 2008/0242498 A1 | 10/2008 | Miller et al. | |
| 2008/0251303 A1 | 10/2008 | Rouaud et al. | |
| 2008/0257311 A1 | 10/2008 | Spicer et al. | |
| 2008/0284378 A1 * | 11/2008 | Birke et al. | 320/149 |
| 2008/0295493 A1 * | 12/2008 | Applegate et al. | 60/286 |
| 2008/0314027 A1 | 12/2008 | Barber et al. | |
| 2009/0115491 A1 | 5/2009 | Anwar et al. | |
| 2009/0118090 A1 | 5/2009 | Heap et al. | |
| 2009/0118969 A1 | 5/2009 | Heap et al. | |
| 2009/0188450 A1 | 7/2009 | Kline et al. | |
| 2009/0195203 A1 | 8/2009 | Yurgil | |
| 2009/0197727 A1 | 8/2009 | Janson | |
| 2009/0197728 A1 | 8/2009 | Janson | |
| 2009/0199553 A1 | 8/2009 | Nishimura et al. | |
| 2009/0200094 A1 | 8/2009 | Zohrer et al. | |
| 2009/0200095 A1 | 8/2009 | Kawasaki | |
| 2009/0205886 A1 | 8/2009 | Supina et al. | |
| 2009/0209146 A1 | 8/2009 | Jegel | |
| 2009/0209381 A1 | 8/2009 | Ai et al. | |
| 2009/0221390 A1 | 9/2009 | Houle | |
| 2009/0223727 A1 | 9/2009 | Tolksdorf | |
| 2009/0324453 A1 | 12/2009 | Harinath et al. | |
| 2010/0052618 A1 * | 3/2010 | Inoue et al. | 320/134 |
| 2010/0079111 A1 * | 4/2010 | Masuda | 320/134 |
| 2010/0107608 A1 * | 5/2010 | Mitsutani | 60/285 |
| 2010/0242446 A1 * | 9/2010 | Granqvist | 60/286 |
| 2010/0280698 A1 | 11/2010 | Ichikawa | |
| 2011/0047981 A1 * | 3/2011 | Roos et al. | 60/286 |
| 2011/0060538 A1 * | 3/2011 | Fahimi et al. | 702/63 |
| 2011/0125351 A1 * | 5/2011 | Bauerle | 701/22 |

* cited by examiner

APPARATUSES, METHODS, AND SYSTEMS FOR THERMAL MANAGEMENT OF HYBRID VEHICLE SCR AFTERTREATMENT

CROSS REFERENCE TO RELATED APPLICATIONS

The present application is a continuation of U.S. patent application Ser. No. 12/982,963 filed on Dec. 31, 2010 now abandoned, which is incorporated herein by reference.

BACKGROUND

The present application relates to apparatuses, methods and systems for thermal management of hybrid vehicle selective catalytic reduction (SCR) aftertreatment, and more particularly, but not exclusively to apparatuses, methods and systems including an electrical heater for thermal management of an SCR catalyst, an SCR decomposition reactor, and/or related SCR components. SCR systems are useful to reduce emissions of nitrogen oxides ($NO_x$) produced by internal combustion engines. These systems typically use a reductant such as ammonia or urea-based reductants such as diesel exhaust fluid (DEF) which decompose into ammonia in connection with an SCR catalyst to convert the $NO_x$ to nitrogen gas ($N_2$) and water vapor ($H_2O$). Both decomposition of reductants such as urea and operation of SCR catalysts are temperature dependent and can benefit from thermal management to provide desired operating temperatures or temperature ranges. Present approaches to thermal management of SCR aftertreatment suffer from a variety of limitations and problems including difficulties in achieving, controlling and maintaining desired temperatures or temperature ranges. Hybrid vehicles present complicating challenges for thermal management of SCR aftertreatment due to reduced engine operation and engine start and stop events. There is a need for the unique and inventive methods, systems and apparatuses disclosed herein.

SUMMARY

Some exemplary embodiments include unique SCR exhaust aftertreatment temperature control systems for hybrid vehicles. Some exemplary embodiments include unique methods of controlling or managing SCR exhaust aftertreatment temperatures in hybrid vehicles. Some exemplary embodiments include unique SCR exhaust aftertreatment temperature control apparatuses for hybrid vehicles. Some exemplary embodiments include hybrid vehicle systems including an engine operable to output exhaust, an exhaust aftertreatment system configured to receive the exhaust from the engine, the exhaust aftertreatment system including an SCR catalyst operable to reduce NOx in the exhaust and an electrical heater operable to heat the SCR catalyst, a motor/generator operable in a braking mode to receive torque to slow the vehicle and output electrical power, an energy storage device operable to output electrical power to drive the motor/generator and receive electrical power from the motor/generator, and a controller operable to control the electrical heater to heat the SCR catalyst using electrical power from the motor/generator in the braking mode. Further embodiments, forms, objects, features, advantages, aspects, and benefits shall become apparent from the following description, drawings and claims.

DETAILED DESCRIPTION

For purposes of promoting an understanding of the principles of the invention, reference will now be made to the exemplary embodiments illustrated in the figures and specific language will be used to describe the same. It will nevertheless be understood that no limitation of the scope of the invention is thereby created, and that the invention includes and protects such alterations and modifications to the illustrated embodiments, and such further applications of the principles of the invention illustrated therein as would occur to one skilled in the art to which the invention relates.

Figure 1:
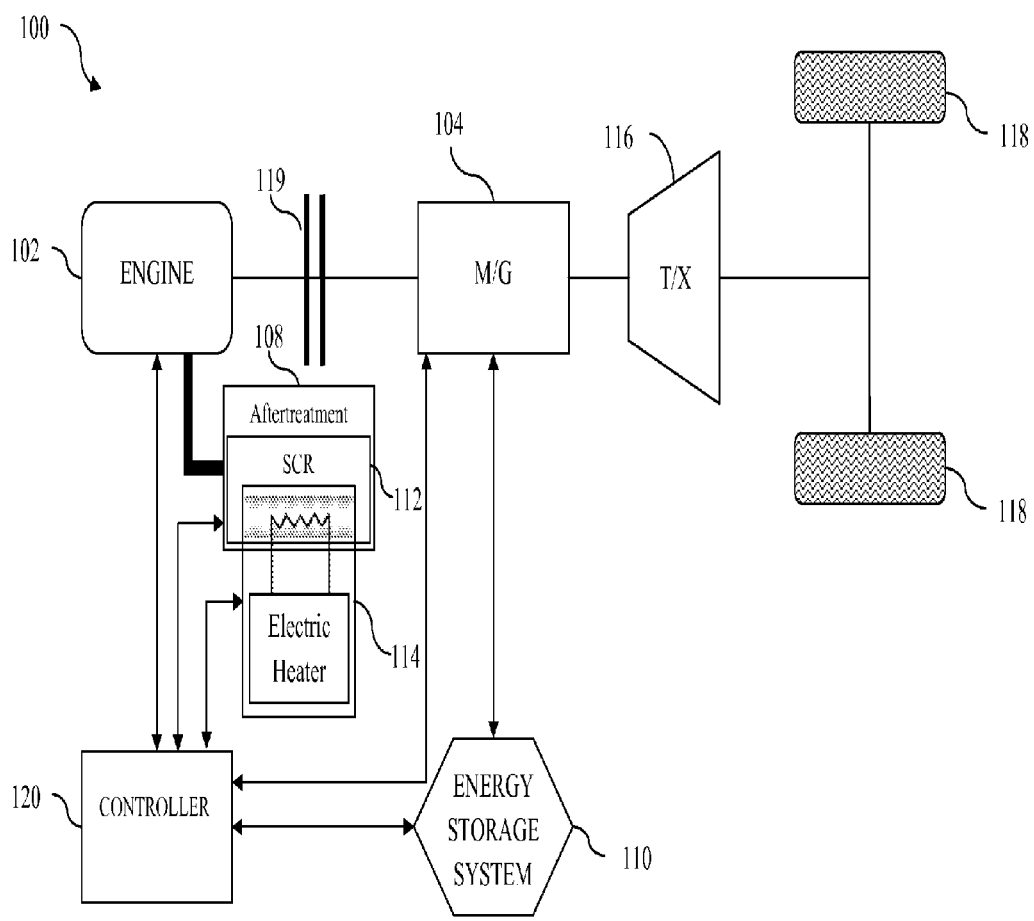
FIG. 1 is a schematic illustration of an exemplary hybrid vehicle system.

FIG. 1 illustrates an exemplary hybrid vehicle system 100. Hybrid vehicle system 100 includes a hybrid powertrain including an internal combustion engine 102 and a motor/generator 104 which are selectably coupled to one another by a controllable clutch 119. Motor/generator 104 is electrically coupled with an electrical energy storage system 110 which preferably includes a battery or other energy storage device, a power bus, and power conversion electronics which can convert electrical power received from motor/generator 104 for storage in the battery and convert power from the battery to drive motor/generator 104. It shall be understood that the battery of electrical energy storage system 110 may include a number of devices, for example, battery banks, battery packs, ultracapacitors and other types of energy storage devices. For simplicity, however, the term battery is used to inclusively describe these possibilities. It shall further be understood that power distribution may be provided in a number of manners including, distribution through a power bus from one or more components acting as a power source to one or more components drawing power, as well as through direct power connections between components. Furthermore, power distribution may involve additional intermediate power devices between one or more components acting as a power source to one or more components drawing power, including power converters, inverters, rectifiers and other power electronics.

The powertrain of hybrid vehicle system 100 may be operated in different vehicle propulsion modes so that engine 102, motor/generator 104, or both engine 102 and motor/generator 104 provide torque to a transmission 116 which, in turn, provides torque to the drive wheels 118 of the hybrid vehicle. The powertrain of hybrid vehicle system 100 may also be operated so that engine 102 drives motor/generator 104 to recharge a battery or other energy storage device of energy storage system 110, or to power one or more engine accessories or other electrically powered devices such as an electrical heater. The powertrain of hybrid vehicle system 100 may further be operated in a regenerative braking mode in which the motor/generator 104 receives torque from the vehicle wheels 118 and generates electrical power which can be used to recharge a battery or other energy storage device of energy storage system 110, or to power one or more engine accessories or other electrically powered devices such as an electrical heater. It shall be understood that the powertrain of hybrid vehicle system 100 is an exemplary configuration and that additional embodiments contemplate other hybrid powertrain configurations, including, for example, series hybrid powertrain configurations, parallel hybrid powertrain configurations, series-parallel hybrid powertrain configurations, power-split hybrid configurations, and hybrid configurations including multiple motor/generators. Furthermore, it shall be understood that additional torque transfer devices for example, clutches, torque converters, gear splitters, differentials, deep reduction gears, and/or other devices may be included in the torque path between engine 102, motor/generator 104 and vehicle wheels 118.

Hybrid vehicle system 100 further includes an exhaust aftertreatment system 108 which includes an SCR aftertreatment device 112 and an electrical heater 114 which is operable to provide heat to the SCR aftertreatment device 112. SCR aftertreatment device 112 may be of the type illustrated and described below in connection with FIG. 2, or n types of SCR aftertreatment devices. Electrical heater 114 may be provided in a number of locations effective to heat SCR aftertreatment device 112 including in contact with or adjacent to SCR aftertreatment device 112, or in an exhaust flowpath of SCR aftertreatment device 112. Exhaust aftertreatment system 108 may also include additional aftertreatment devices, for example, diesel particulate filters, diesel oxidation catalysts and other aftertreatment devices.

Hybrid vehicle system 100 includes a controller 120 which is coupled to and operable to control the operation of engine 102, motor/generator 104, energy storage system 110, aftertreatment system 108, electrical heater 114 and other components and systems of hybrid vehicle system 100, as well as to receive information from such components and systems or from sensors provided therewith. Controller 120 preferably includes one or more microprocessors, digital memories, ASICS and/or other integrated circuitry. For simplicity controller 120 is illustrated as a single unit, but it shall be understood that multiple controller units may be utilized to perform the functions described herein.

Figure 2:
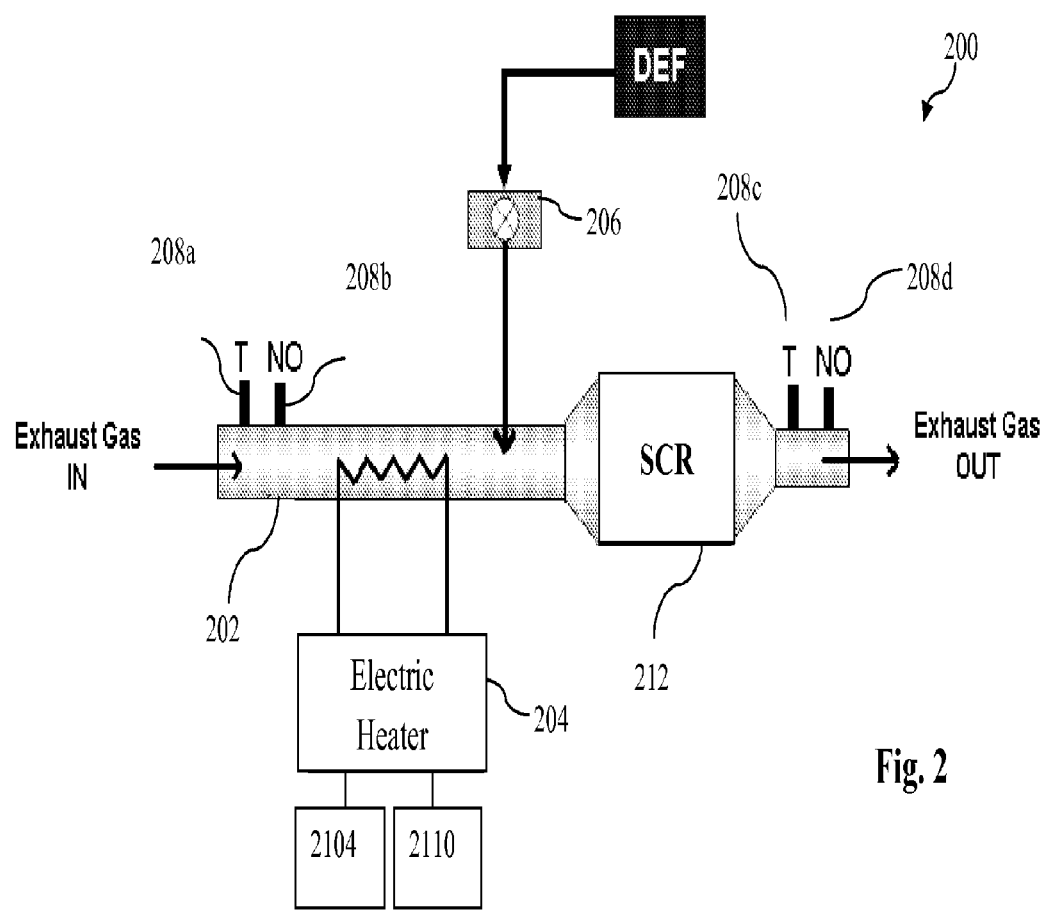
FIG. 2 is a schematic illustration of an exemplary SCR aftertreatment system.

FIG. 2 illustrates an exemplary SCR aftertreatment system 200 which includes an SCR decomposition reactor 202 configured to receive exhaust from an engine. In the illustrated embodiment SCR decomposition reactor 202 is configured as a tube, although SCR decomposition reactors of other configurations may also be utilized. An electrical heater 204 is configured to heat exhaust passing through decomposition reactor 202. Electrical heater 204 is located in SCR decomposition reactor 202 upstream of a doser 206. Doser 206 is operable to introduce reductant into SCR decomposition reactor 202. The reductant is preferably a urea-based diesel exhaust fluid (DEF), however, other reductants such as solid urea or ammonia may also be utilized. At desired operating temperatures, DEF received in SCR decomposition reactor 202 undergoes hydrolysis and is converted to ammonia. SCR catalyst 212 is positioned downstream of doser 206 to receive exhaust and ammonia from SCR decomposition reactor 202 and convert NOx in the exhaust and ammonia into $N_2$ and $H_2O$ through a catalyzed reaction. The upstream location of electrical heater 204 relative to doser 206 limits reactions of the reductant the heating elements of electrical heater 204 and avoids scaling, while simultaneously providing heat to decomposition reactor 202 to provide temperatures or temperature ranges desired for reductant decomposition and to provide heat to SCR catalyst 212 to provide desired SCR catalyst operating temperatures or temperature ranges.

Electrical heater 204 may be controlled to provide a desired temperature for decomposition of a reductant such as urea. In an exemplary embodiment a desired temperature of about 180-220° C. is provided for decomposition of DEF in SCR decomposition reactor 202. Additionally or alternatively electrical heater 204 may be controlled to provide a desired temperature for operation of SCR catalyst 212. The desired temperature may be in a temperature range where performance of the SCR catalyst is optimal, or in a temperature range where reduction of NOx is above a desired level. These temperature ranges for SCR catalyst operation depend upon the particular SCR catalyst utilized. In one exemplary embodiment a copper zeolite (CuZe) SCR catalyst having a desired operation temperature of about 250-350° C. is utilized. Other exemplary embodiments include additional or alternate SCR catalysts having other desired operation temperatures or temperature ranges.

A controller, such as controller 120 described hereinabove, may control electrical heater 204 to operate using electrical power from a motor/generator of a hybrid vehicle as indicated by source 2104, from energy storage device of a hybrid vehicle as indicated by source 2110, or from both sources 2104 and 2110. Power from motor/generator source 2104 may be provided by driving a motor generator with an engine. Power from motor/generator source 2104 may also be provided by a motor/generator in a braking mode where the motor generator receives torque to reduce the speed of a hybrid vehicle and generate electrical power. A thermal management control routine may be operated to monitor the SCR catalyst temperature and to command a heat input from electrical heater 204 to achieve a desired SCR catalyst temperature or temperature range. Controller 120 may also control electrical heater 204 to supplement the engine thermal management of SCR catalyst temperature thereby reducing engine wear.

Information received by a controller from one or more sensors may be used to determine temperature conditions of the SCR decomposition reactor 202 and/or the SCR catalyst 212 which, in turn, may be used to control the operation of heater 204 to achieve desired temperatures or temperature ranges. Temperature conditions of the SCR decomposition reactor 202 and the SCR catalyst 212 can be determined in a number of manners. Certain exemplary embodiments utilize one or more exhaust gas temperature sensors operable to sense exhaust gas temperature, for example, thermocouples, resistance temperature detectors, or other temperature sensors. Certain exemplary embodiments utilize one or more additional or alternate physical sensors, virtual sensors, and/or estimation algorithms in measuring or determining temperature conditions of the SCR decomposition reactor 202 and the SCR catalyst 212.

In the illustrated embodiment, aftertreatment system 200 includes temperature sensors 208a and 208c, and NOx sensors 208b and 208d which are operably coupled with a controller to monitor temperature and NOx operating parameters which are used to control operation of electrical heater 204. In certain exemplary embodiments, temperature sensor 208a is used to monitor temperature of exhaust entering decomposition reactor 202 in connection with a controller operable to heat exhaust within decomposition reactor with electrical heater 204 to achieve a desired decomposition reactor operating temperature or temperature range. In certain exemplary embodiments, temperature sensor 208c is used to monitor the outlet temperature of SCR catalyst 212 to determine its temperature in connection with a controller operable to heat SCR catalyst 212 using electrical heater 204 to achieve desired operating temperatures or temperature ranges of SCR catalyst 212. In certain exemplary embodiments, SCR catalyst temperature is further based upon information from NOx sensors 208b and/or 208d, for example, information of NOx conversion or reduction by SCR catalyst 212 may be used as an additional indication of SCR catalyst temperature based upon a determined SCR catalyst efficiency and/or an SCR catalytic reaction contribution to overall temperature. Aftertreatment system 200 may also include sensors in additional and alternate locations and configurations operable to monitor inlet and outlet temperatures and inlet and outlet NOx levels as well as additional sensors to monitor exhaust airflow and other parameters.

Figure 3:
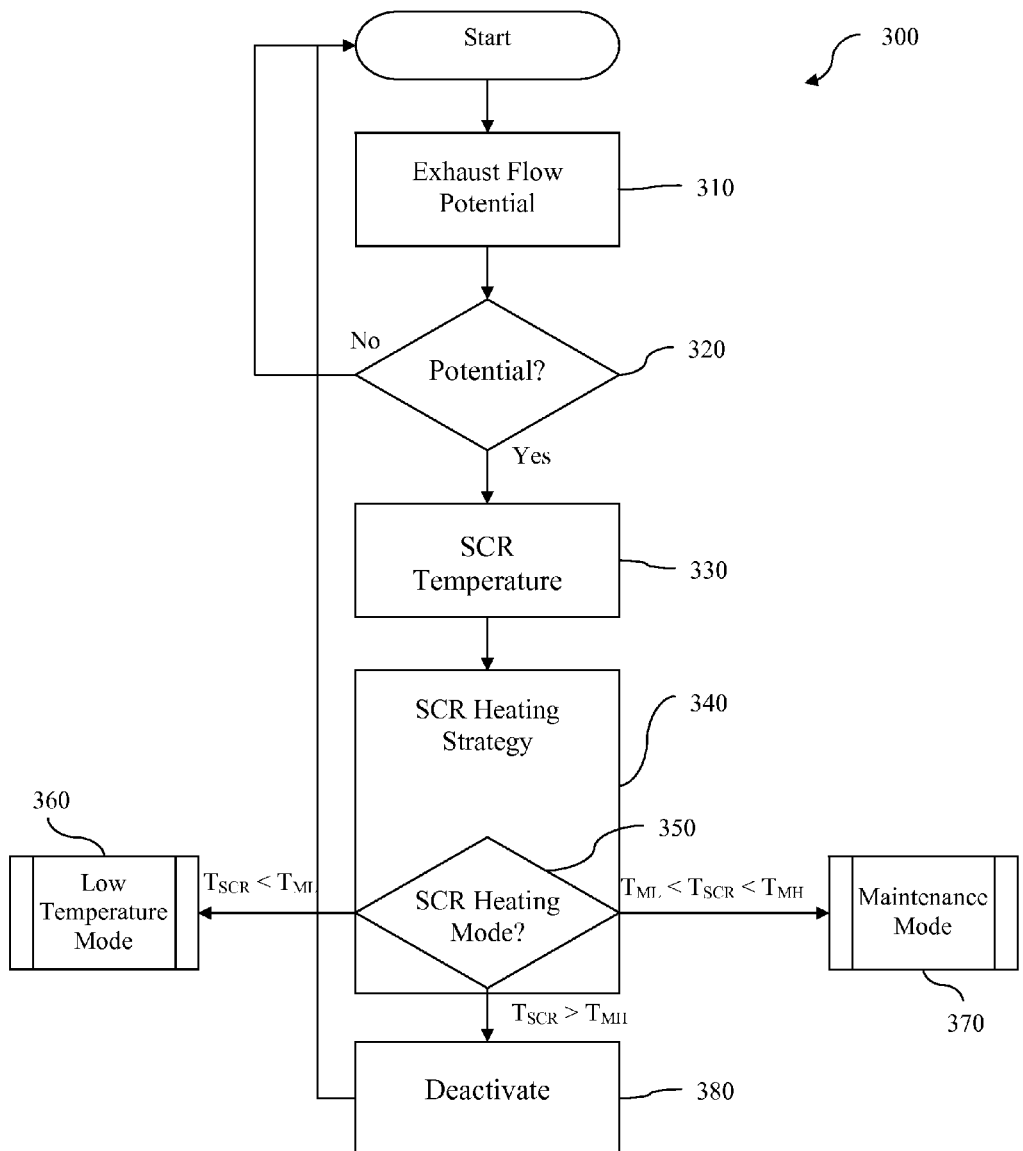
FIG. 3 is a flowchart illustrating an exemplary SCR thermal management procedure.

FIG. 3 illustrates an exemplary thermal management procedure 300 for an SCR aftertreatment system. Thermal management procedure 300 begins by determining an exhaust flow potential in operation 310. Operation 310 may determine an exhaust flow potential based on a number of operating parameters such as engine operating mode, engine speed, turbocharger parameters, $NO_x$ levels at an exhaust inlet and an exhaust outlet and combinations of these and other parameters.

From operation 310, procedure 300 proceeds to conditional 320. Conditional 320 evaluates the exhaust flow potential. If conditional 320 determines that the exhaust flow potential from operation 310 indicates an exhaust gas is moving from an engine through an SCR aftertreatment system, procedure 300 proceeds to operation 330 which determines an SCR temperature. If conditional 320 determines that there is not an exhaust flow potential, procedure 300 returns to start. Operation 330 determines an SCR temperature ($T_{SCR}$) which may be, for example, the temperature of the SCR decomposition reactor tube, the temperature of the SCR catalyst, or the temperature of another component or device of an SCR aftertreatment system. Operation 330 may utilize a number of methods and apparatuses for determining the SCR temperature.

Procedure 300 continues with operation 340 which determines an SCR heating strategy in response to the exhaust flow potential of operation 310 and the SCR temperature of operation 330. After conditional 320 determines whether there is an exhaust gas flow that should be addressed in the aftertreatment components such as an SCR component, operation 340 utilizes the results of operation 310 and operation 330 to determine if an SCR heating strategy may improve the efficiency of the SCR component to remove the $NO_x$ emissions from the exhaust gas of the engine of the hybrid propulsion system. The SCR heating strategy determined in operation 340 includes selecting an SCR heating mode in conditional 350.

Conditional 350 evaluates the SCR temperature ($T_{SCR}$) by comparing it to an exhaust temperature threshold range. If $T_{SCR}$ is greater than a maximum exhaust temperature threshold ($T_{MH}$), procedure 300 performs deactivate operation 380 which deactivates an electrical heating element that provides heat to the SCR aftertreatment system and returns to the beginning of procedure 300 to continue monitoring the exhaust flow potential and the SCR temperature. If conditional 350 identifies the $T_{SCR}$ as being less than a minimum exhaust temperature threshold ($T_{ML}$) then procedure 300 enters a low temperature mode 360. A temperature below $T_{ML}$ may indicate operating conditions less efficient for SCR components. In low temperature mode 360, procedure 300 operates the SCR thermal management system to increase the SCR temperature and improve the efficiency of the SCR aftertreatment system. If conditional 350 determines that the $T_{SCR}$ is greater than $T_{ML}$ but less than maximum exhaust temperature threshold ($T_{MH}$), procedure 300 enters a temperature maintenance mode 370. Temperature maintenance mode 370 operates the SCR thermal management system to maintain a temperature within an exhaust temperature threshold range thereby maintaining the SCR component efficiency.

FIGS. 4a, 4b, 4c and 4d illustrate schematic diagrams of power source distribution modes for a hybrid vehicle SCR thermal management system. A hybrid vehicle SCR thermal management system or control routine may power an electrical SCR heater from an energy storage device such as a battery, an engine generation source wherein a motor/generator is driven by an engine, a combination of the energy storage device and an engine generation source, a regenerative braking source, or a regenerative braking source in combination with an energy storage device.

Figure 4A:
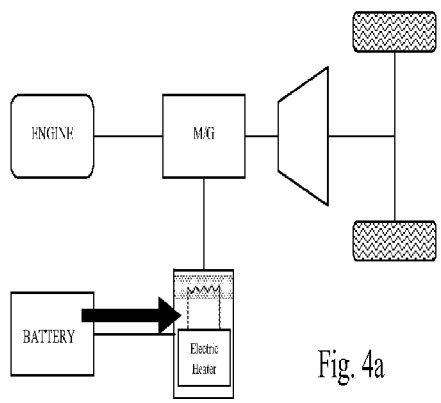
FIGS. 4*a*, 4*b*, 4*c* and 4*d* are schematic illustrations of exemplary operating modes of an SCR thermal management system.

In the mode illustrated in FIG. 4a, the electric heater is operated using power from the energy storage device. This mode of may be selected in response to the SCR thermal strategy determined from an exhaust flow potential and the $T_{SCR}$ when the state of charge of the energy storage device ($SOC_{ESD}$) is above a state of charge threshold ($SOC_{OT}$). This mode may be used to power the electric heater during engine warm up or under other conditions where the exhaust temperature alone does not provide desired SCR temperatures.

Figure 4B:
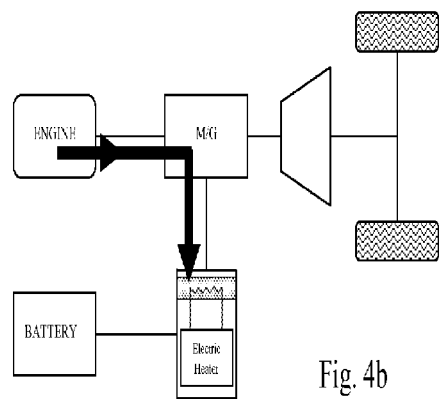

In the mode illustrated in FIG. 4b, the electric heater is operated using power from the motor/generator driven by the engine. In this mode, the engine supplies power to the motor/generator which generates power to operate the electrical heater. This mode may be selected when $SOC_{ESD}$ is below $SOC_{OT}$. By having the engine operating to supply power to the generator, the exhaust gas temperature may also be increased due to the increased load on the engine. The higher temperature exhaust gases may add further heat to the SCR system. The SCR system may obtain an efficient operating level at an increased rate with the heat from the electrical heater and the heat in the exhaust gas from the operating engine.

Figure 4C:
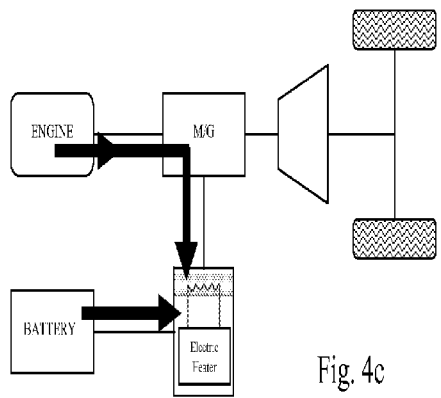

In the mode illustrated in FIG. 4c, the electric heater is operated using power from the motor/generator driven by the engine in combination with energy from the energy storage device. This mode may be selected when the energy storage device is able to supply some but not all of the power desired for the electrical heater. This mode may also be selected when the motor/generator driven by the engine is able to supply some but not all of the power desired for the electrical heater.

Figure 4D:
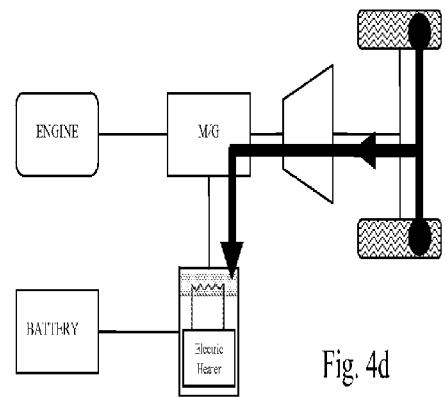

In the mode illustrated in FIG. 4d, the electric heater is operated using power from the motor/generator driven by regenerative braking. This mode may also be selected during a regenerative braking event, for example, a regenerative braking event initiated in response to an operator command. This mode may also be used to supplement or assist engine braking in a hybrid propulsion system. When the energy storage device is completely charged or at a maximum charge threshold and no more regenerative braking energy can be captured by the energy storage device, an engine braking system may be deployed to maintain a consistent feel of braking. Under such circumstances, instead of or in addition to using engine braking, the electrical SCR heater may be used to reject the generated energy as heat through the coils of the electrical heater in the SCR aftertreatment system, thereby reducing wear on the engine. This mode may also be used in combination with other power sources. For example, the electric heater can be operated using power from the motor/generator driven by regenerative braking in combination with power from the energy storage device, or in combination with power from a second motor/generator driven by the engine.

Figure 5A:
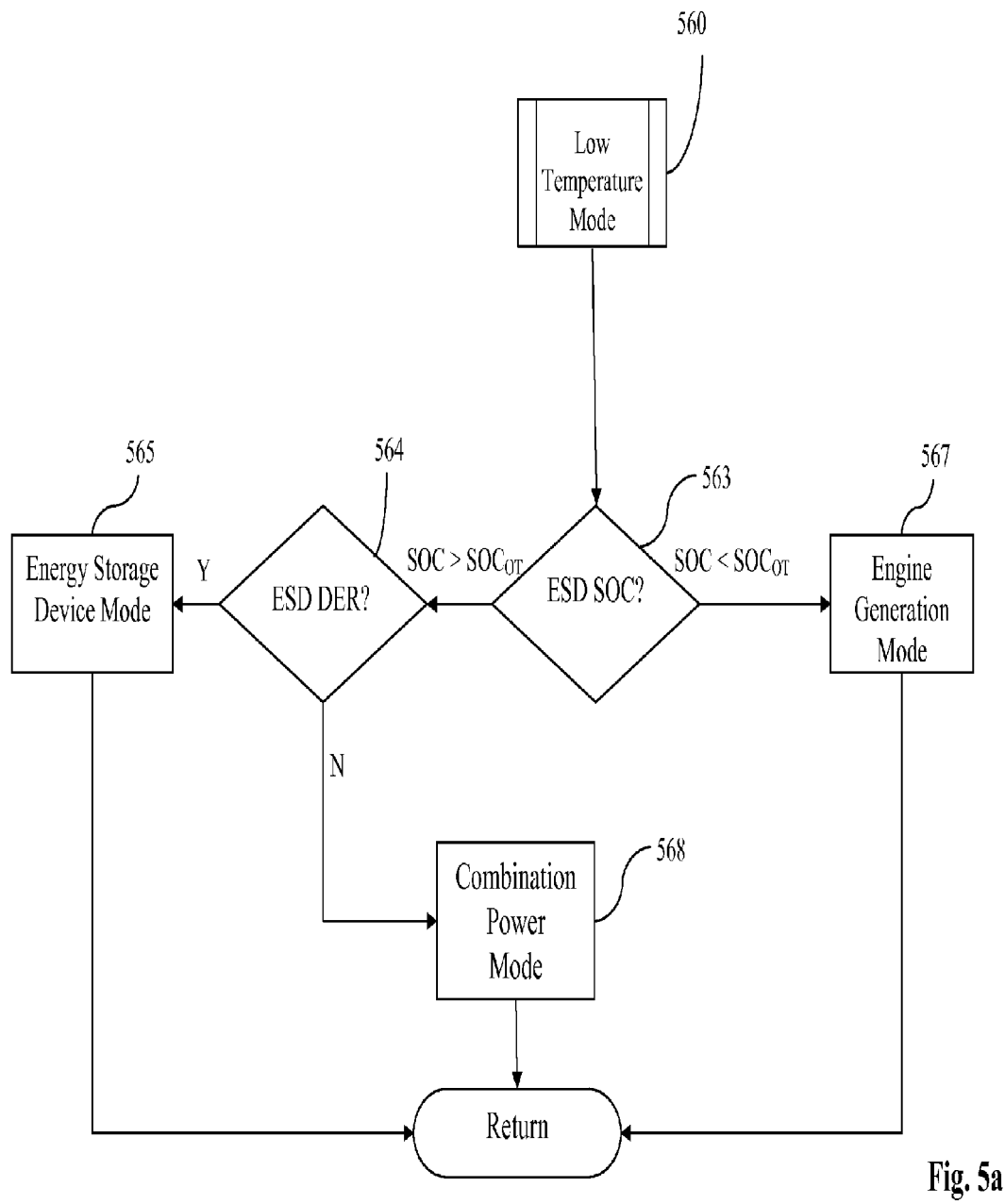
FIG. 5*a* is a flowchart illustrating an exemplary SCR thermal management procedure.
Figure 5B:
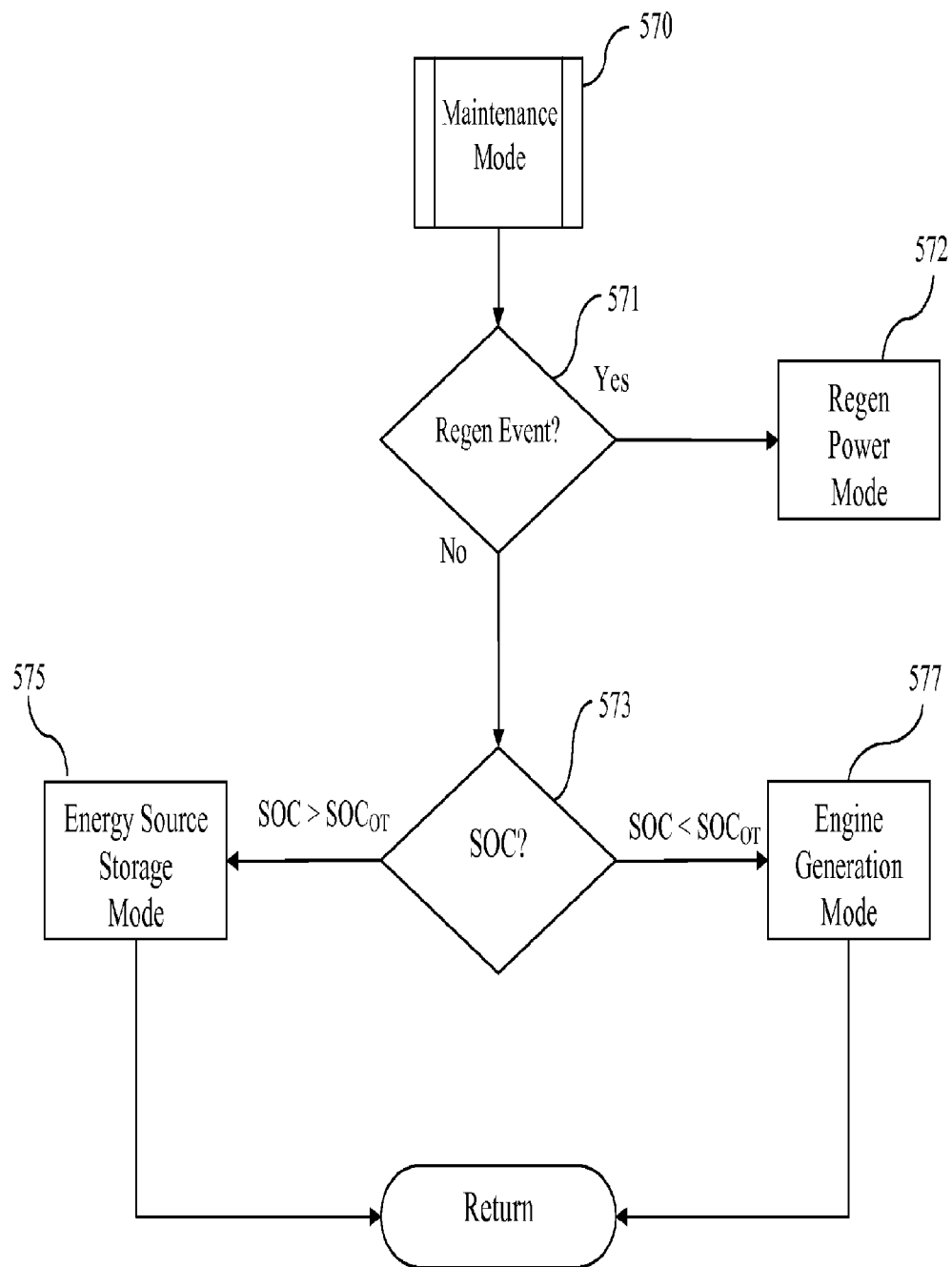
FIG. 5*b* is a flowchart illustrating an exemplary SCR thermal management procedure.

FIGS. 5a and 5b are flow charts illustrating exemplary SCR heating modes—low temperature mode 560 and temperature maintenance mode 570, respectively. These modes may be used to determine what power source is used to power an electrical SCR heater. During low temperature operating modes such as a cold-start of an engine, an SCR thermal management system may utilize an electrical SCR heater to draw energy from one or more of several power sources, for example, the power source modes and combinations described above in connection with FIGS. 4a, 4b, 4c and 4d. The electrical SCR heater is powered by one or more power sources effective to heat an SCR catalyst, an SCR decomposition chamber, or both. This heating may be accomplished, for example, by using the SCR heater to heat exhaust flowing through or to one or more SCR components or by directly heating one or more SCR components. The rate of warm up may be determined by the capacity of the electrical SCR heater, the load which can be placed on the engine to heat exhaust, and the control strategy that commands heater power. Cold-start NOx emissions may be reduced by the operation of the SCR thermal management system.

As illustrated in FIG. 5a, operation 560 initiates a low temperature mode, for example, during an engine cold start event or other low temperature situation. From operation 560 low temperature mode proceeds to conditional 563. Conditional 563 evaluates the energy storage device state of charge $SOC_{ESD}$ against a state of charge threshold ($SOC_{OT}$) to determine whether the battery has a sufficient state of charge to provide power for the electrical SCR heater. In further embodiments, this determination may evaluate the state of charge of the battery or other energy storage device as well as the power demands being placed on the energy storage device by other loads, the power load needed for the electrical SCR heater, and/or combinations to these and other factors relating the ability of the energy storage device to power the electrical SCR heater.

If conditional 563 determines that $SOC_{ESD}$ is greater than a state of charge threshold ($SOC_{OT}$), or otherwise determines that the energy storage device is available to provide at least some power to the electrical SCR heater, low temperature mode 560 continues to conditional 564. Conditional 564 determines whether an energy storage device derate condition is present by evaluating whether the energy storage device is able the meet the entire power load desired or commanded for the electrical SCR heater. This evaluation may be based upon a number of criteria including for example, the temperature of the energy storage device, the life remaining in the energy storage device (e.g., the expected number of charging/discharging events that a battery may experience while still conforming to operational requirements), other existing and predicted loads on the energy storage device, the load needed for the electrical SCR heater and combinations of these and other criteria relating to the ability of the energy storage device to meet the entire desired or commanded power load for the electrical SCR heater.

If conditional 564 determines that the energy storage device is able to meet the entire power load desired or commanded for the electrical SCR heater, low temperature mode 560 proceeds to energy storage device power mode 565 which uses the energy storage device to power the electrical SCR heater. If conditional 564 determines that the energy storage device is not able to meet the entire power load desired or commanded for the electrical SCR heater low temperature mode 560 proceeds to combination power mode 568 which uses power from the energy storage device and power from a motor/generator driven by the engine to power the electrical SCR heater.

If conditional 563 determines that $SOC_{ESD}$ is less than $SOC_{OT}$, or otherwise determines that the energy storage device is not available to provide at least some power to the electrical SCR heater, low temperature mode 560 proceeds to engine generation power mode 567 which uses power from a motor/generator driven by the engine to power the electrical SCR heater. Each of modes 565, 567 and 568 returns to procedure 300 to reevaluate conditions to determine the continued use of the SCR thermal management system. It is also contemplated that low temperature mode may evaluate whether a regenerative braking event is occurring and utilizes power generated by a motor generator to power an electrical SCR heater alone or in combination with power from an energy storage device.

When an SCR catalyst temperature starts to drop below a desired operating temperature or temperature range, for example, due to engine shut off events, engine idling, or lightly loaded engine operation, an electrical SCR heater may be operated to maintain or bring the SCR components to a desired temperature or temperature range. This temperature maintenance mode of operation may provide desired NOx conversion efficiency throughout the engine duty cycle of a hybrid vehicle system.

FIG. 5b illustrates an exemplary temperature maintenance mode 570. Maintenance mode 570 evaluates whether a regenerative braking event is detected in conditional 571. If conditional 571 detects a regenerative braking event, temperature maintenance mode 570 utilizes regenerative braking power mode 572 to provide at least some of the power needed by the electrical SCR heater. If power available from regenerative braking is not sufficient to meet the power needed by the electrical SCR heater, additional power may be provide from an energy storage device.

If conditional 571 does not detect a regenerative braking event, temperature maintenance mode 570 continues to conditional 573 which evaluates a state of charge of an energy storage device ($SOC_{ESD}$), or performs additional evaluations such as those described above in connection with FIG. 5a. If conditional 573 determines that $SOC_{ESD}$ is greater than a state of charge threshold ($SOC_{OT}$), or otherwise determines that the battery is unavailable to power the electrical SCR heater, temperature maintenance mode 570 continues to energy storage device power mode 575 which uses an energy storage device to power the electrical SCR heater. If it is determined that $SOC_{ESD}$ is less than $SOC_{OT}$, temperature maintenance mode 570 utilizes an engine generation power mode 577 which uses a motor/generator driven by the engine to power the electrical SCR heater. Additional embodiments may further evaluate whether the energy storage device is available to provide at least part of the power needed by the electrical SCR heater and use either the energy storage device alone or in combination with a motor/generator driven they the engine, for example, as described above in connection with FIG. 5a. Each power mode of the temperature maintenance mode returns to procedure 300 to reevaluate conditions to determine the continued use of the SCR thermal management system.

Some exemplary embodiments include a hybrid vehicle system comprising an engine operable to output exhaust, an exhaust aftertreatment system configured to receive the exhaust from the engine, the exhaust aftertreatment system including an SCR catalyst operable to reduce NOx in the exhaust and an electrical heater operable to heat the SCR catalyst, a motor/generator operable in a braking mode to receive torque to slow the vehicle and output electrical power, an energy storage device operable to output electrical power to drive the motor/generator and receive electrical power from the motor/generator, and a controller operable to control the electrical heater to heat the SCR catalyst using electrical power from the motor/generator in the braking mode. In certain exemplary forms the controller is operable to determine a charge condition of the energy storage device and to control the electrical heater to heat the SCR catalyst using electrical power from energy storage device based upon the charge condition of the energy storage device.

In certain exemplary embodiments the controller is operable to control the electrical heater to heat the SCR catalyst using electrical power from the motor/generator in the braking mode in combination with electrical power from energy storage device.

In certain exemplary embodiments the controller is operable to determine a charge condition of the energy storage device and to control the electrical heater to heat the SCR catalyst using electrical power from the energy storage device or using electrical power from the motor/generator being driven by the engine based upon the charge condition of the energy storage device.

In certain exemplary embodiments the controller is operable determine an energy storage device derate condition and to control the electrical heater to heat the SCR catalyst using electrical power from the motor/generator being driven by the engine in combination with electrical power from the energy storage device based upon the energy storage device derate condition. In certain exemplary embodiments the energy storage device derate condition is based upon a temperature of the energy storage device.

In certain exemplary embodiments the exhaust aftertreatment system includes a decomposition reactor and a doser operable to introduce reductant into the decomposition reactor at a location upstream of the SCR catalyst, and the electrical heater is operable to heat exhaust in the decomposition reactor at a location upstream of the doser effective to heat the SCR catalyst. In certain exemplary embodiments the controller is operable to determine a temperature condition of the SCR catalyst, determine a temperature condition of the decomposition reactor, and to control the electrical heater based upon the temperature condition of the SCR catalyst or the temperature condition of the decomposition reactor.

In certain exemplary embodiments the controller is operable to determine an exhaust flow potential from the engine, determine an SCR temperature, determine a state of charge of the energy storage device, determine a regenerative braking event, and selectively power the electrical heater with the energy storage device, the motor/generator, or both based upon the exhaust flow potential, the SCR temperature, the state of charge of the energy storage device, and the regenerative braking event.

In certain exemplary embodiments the controller is operable to control operation of the electrical heater in a low temperature operating mode when the SCR temperature is less than a minimum temperature threshold, in a temperature maintenance mode when the SCR temperature is greater than the minimum temperature threshold and less than a maximum temperature threshold, and in an inactive mode when the SCR temperature is greater than the maximum temperature threshold.

Some exemplary embodiments include a method comprising providing a hybrid vehicle system including an internal combustion engine, a motor/generator, an SCR exhaust aftertreatment system including an SCR catalyst and an electrical heater, and an energy storage device, determining a flow of exhaust gas from the internal combustion engine, determining an SCR temperature of the SCR aftertreatment system, determining a state of charge of the energy storage device, determining a regenerative braking event, and controlling the electrical heater to heat the SCR catalyst based upon the flow of exhaust gas, the SCR temperature, the state of charge, and the regenerative braking event.

In certain exemplary embodiments controlling the electrical heater includes operating the electrical heater in a low temperature operating mode when the SCR temperature is less than a minimum temperature threshold; operating the electrical heater in a temperature maintenance mode when the SCR temperature is greater than the minimum temperature threshold and less than a maximum temperature threshold; and deactivating the electrical heater when the SCR temperature is greater than the maximum temperature threshold. In certain exemplary embodiments the low temperature operating mode powers the electrical heater in a first mode using power from the energy storage device, in a second mode using power from the motor/generator being driven by the engine, and in a third mode using power from both the energy storage device and the motor/generator being driven by the engine. In certain exemplary embodiments operation in the first mode, the second mode or the third mode is controlled based upon the state of charge of the energy storage device and an energy storage device derate condition.

In certain exemplary embodiments the energy storage device includes a battery and the derate condition is determined based upon a temperature condition of the battery and a remaining life condition of the battery. In certain exemplary embodiments the SCR exhaust aftertreatment system includes a decomposition reactor at a location upstream of the SCR catalyst and the electrical heater is operable to heat exhaust in the decomposition reactor based upon a temperature condition of the decomposition reactor.

Some exemplary embodiments include a hybrid vehicle system comprising an engine operable to output exhaust, an SCR exhaust aftertreatment system including an SCR catalyst and a decomposition reactor configured to receive exhaust from the engine and to receive reductant, an electrical heater operable to heat exhaust in the decomposition reactor, a motor/generator operable as a motor to output torque and operable as a generator to output electrical power, an energy storage device operable to provide electrical power to the motor/generator and receive electrical power from the motor/generator, and a controller operable to determine a temperature condition of the decomposition reactor and control the electrical heater to heat exhaust in the decomposition reactor using power from the energy storage device or power from the motor/generator based upon the temperature condition of the decomposition reactor.

In certain exemplary embodiments the motor/generator is operable in a braking mode to receive torque to slow the vehicle and output electrical power and in a generator mode to receive torque from the engine and output electrical power and the controller is operable to control the electrical heater to heat exhaust in the decomposition reactor using power from the motor/generator in the braking mode or power from the motor/generator in the generator mode.

In certain exemplary embodiments the controller is operable to control the electrical heater to heat exhaust in the decomposition reactor using power from the energy storage device in combination with power from the motor/generator. In certain exemplary embodiments the controller is operable to control the electrical heater to heat exhaust in the decomposition reactor in a first mode using power from the energy storage device in combination with power from the motor/generator driven by the engine and in a second mode using power from the energy storage device in combination with power from the motor/generator driven by regenerative braking.

Some exemplary embodiments include a hybrid vehicle system including an internal combustion engine with an exhaust pathway, a motor/generator, an energy storage device, a regenerative braking system, and an aftertreatment system with an SCR component and an SCR thermal management system including an SCR decomposition reactor tube having an electrical SCR heater upstream of a reductant doser. The hybrid vehicle system includes a controller capable of determining exhaust flow from the internal combustion engine through the exhaust pathway, determining a state of charge of an energy storage device, determining an SCR temperature, determining a regenerative braking event, and operating the electrical SCR heater in an SCR heating more based upon the exhaust flow, the state of charge of an energy storage device, the SCR temperature, and/or the regenerative braking event.

The SCR heating mode may include a low temperature operating mode when the SCR temperature is less than a minimum temperature threshold, a temperature maintenance mode when the SCR temperature is greater than the minimum temperature threshold and less than a maximum temperature threshold, and an inactive mode when the SCR temperature is greater than the maximum temperature threshold.

The low temperature operating mode may power the electrical SCR heater with the energy storage device when the state of charge of the energy storage device is above a threshold, power the electrical SCR heater with the motor/generator driven by the engine when the state of charge of the energy storage device is not above a threshold, and power the electrical SCR heater with the motor/generator driven by regenerative braking when a regenerative braking event is determined. The low temperature operating mode may power the electrical SCR heater with the energy storage device and the motor/generator driven by regenerative braking when power available from regenerative braking is less than the power desired to power the electrical SCR heater. The low temperature operating mode may power the electrical SCR heater with the energy storage device and the motor/generator driven by the engine with the energy storage device is determined to be capable of providing part but not all of the power desired to power the electrical SCR heater.

The temperature maintenance mode may be selected in response to a power distribution mode where the power distribution mode includes an energy storage mode when the regenerative braking event is not detected and the state of charge is greater than an operating state of charge threshold; an engine generation mode when the regenerative braking event is not detected and the state of charge is less than the operating state of charge threshold; and a regenerative braking power mode when the regenerative braking event is detected.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A hybrid vehicle system comprising:
   an engine operable to output exhaust;
   an exhaust aftertreatment system configured to receive the exhaust from the engine, the exhaust aftertreatment system including an SCR catalyst operable to reduce NOx in the exhaust and an electrical heater operable to heat the SCR catalyst;
   a motor/generator operable in a braking mode to receive torque to slow the vehicle and output electrical power;
   an energy storage device operable to output electrical power to drive the motor/generator and receive electrical power from the motor/generator; and
   a controller operable in the braking mode to control the electrical heater to heat the SCR catalyst using electrical power from the motor/generator in the braking mode simultaneously with electrical power from the energy storage device when the energy storage device is at a maximum charge threshold to reject energy generated in the braking mode as heat through the electrical heater to maintain consistent braking.

2. A hybrid vehicle system according to claim 1 wherein the controller is operable to determine a charge condition of the energy storage device and to control the electrical heater to heat the SCR catalyst using electrical power from the energy storage device based upon the charge condition of the energy storage device.

3. A hybrid vehicle system according to claim 2 wherein the motor/generator is operable in a generator mode to receive torque from the engine and output electrical power and wherein the controller is operable to control the electrical heater to heat the SCR catalyst using electrical power from the motor/generator in the generator mode in combination with electrical power from the energy storage device.

4. A hybrid vehicle system according to claim 1 wherein the controller is operable to determine a charge condition of the energy storage device and to control the electrical heater to heat the SCR catalyst using electrical power from the energy storage device or using electrical power from the motor/generator being driven by the engine based upon the charge condition of the energy storage device.

5. A hybrid vehicle system according to claim 4 wherein the controller is operable to determine an energy storage device derate condition and to control the electrical heater to heat the SCR catalyst using electrical power from the motor/generator being driven by the engine in combination with electrical power from the energy storage device based upon the energy storage device derate condition.

6. A hybrid vehicle system according to claim 5 wherein the energy storage device derate condition is based upon a temperature of the energy storage device.

7. A hybrid vehicle system according to claim 1 wherein the exhaust aftertreatment system includes a decomposition reactor and a doser operable to introduce reductant into the decomposition reactor at a location upstream of the SCR catalyst, and the electrical heater is operable to heat exhaust in the decomposition reactor at a location upstream of the doser effective to heat the SCR catalyst.

8. A hybrid vehicle system according to claim 7 wherein the controller is operable to determine a temperature condition of the SCR catalyst, determine a temperature condition of the decomposition reactor, and to control the electrical heater based upon the temperature condition of the SCR catalyst or the temperature condition of the decomposition reactor.

9. A hybrid vehicle system according to claim 1 wherein the controller is operable to determine an exhaust flow potential from the engine, determine an SCR temperature, determine a state of charge of the energy storage device, determine a regenerative braking event, and selectively power the electrical heater with the energy storage device, the motor/generator, or both based upon the exhaust flow potential, the SCR temperature, the state of charge of the energy storage device, and the regenerative braking event.

10. A hybrid vehicle system according to claim 9 wherein the controller is operable to control operation of the electrical heater in a low temperature operating mode when the SCR temperature is less than a minimum temperature threshold, in a temperature maintenance mode when the SCR temperature is greater than the minimum temperature threshold and less than a maximum temperature threshold, and in an inactive mode when the SCR temperature is greater than the maximum temperature threshold.

11. A method comprising:
providing a hybrid vehicle system including an internal combustion engine, a motor/generator, an SCR exhaust aftertreatment system including an SCR catalyst and an electrical heater, and an energy storage device;
determining a flow of exhaust gas from the internal combustion engine;
determining an SCR temperature of the SCR aftertreatment system;
determining a state of charge of the energy storage device, determining a regenerative braking event; and
controlling the electrical heater to receive power simultaneously from the energy storage device and from the motor/generator during the regenerative braking event to heat the SCR catalyst when the state of charge of the energy storage device is at a maximum charge threshold to reject energy generated during the regenerative braking event as heat through the electrical heater to maintain consistent braking.

12. The method of claim 11 wherein the controlling the electrical heater includes operating the electrical heater in a low temperature operating mode when the SCR temperature is less than a minimum temperature threshold; operating the electrical heater in a temperature maintenance mode when the SCR temperature is greater than the minimum temperature threshold and less than a maximum temperature threshold; and deactivating the electrical heater when the SCR temperature is greater than the maximum temperature threshold.

13. The method of claim 12 wherein the low temperature operating mode powers the electrical heater in a first mode using power from the energy storage device, in a second mode using power from the motor/generator being driven by the engine, and in a third mode using power from both the energy storage device and the motor/generator being driven by the engine.

14. The method of claim 13 wherein operation in the first mode, the second mode or the third mode is controlled based upon the state of charge of the energy storage device and an energy storage device derate condition.

15. The method of claim 14 wherein the energy storage device includes a battery and the derate condition is determined based upon a temperature condition of the battery and a remaining life condition of the battery.

16. The method of claim 11 wherein the SCR exhaust aftertreatment system includes a decomposition reactor at a location upstream of the SCR catalyst and the electrical heater is operable to heat exhaust in the decomposition reactor based upon a temperature condition of the decomposition reactor.

17. A hybrid vehicle system comprising:
an engine operable to output exhaust;
an SCR exhaust aftertreatment system including an SCR catalyst and a decomposition reactor configured to receive exhaust from the engine and a doser upstream of the SCR catalyst operable to introduce reductant into the decomposition reactor;
an electrical heater operable to heat exhaust in the decomposition reactor, wherein the electrical heater is located in the decomposition reactor upstream of the doser;
a motor/generator operable as a motor to output torque and operable as a generator to output electrical power;
an energy storage device operable to provide electrical power to the motor/generator and receive electrical power from the motor/generator; and
a controller operable to determine a temperature condition of the exhaust entering the decomposition reactor and control the electrical heater to heat exhaust in the decomposition reactor using power from the energy storage device or power from the motor/generator based upon the temperature condition of the exhaust entering the decomposition reactor.

18. A system according to claim 17 wherein the motor/generator is operable in a braking mode to receive torque to slow the vehicle and output electrical power and in a generator mode to receive torque from the engine and output electrical power and the controller is operable to control the electrical heater to heat exhaust in the decomposition reactor using power from the motor/generator in the braking mode or power from the motor/generator in the generator mode.

19. A system according to claim 17 wherein the controller is operable to control the electrical heater to heat exhaust in the decomposition reactor using power from the energy storage device simultaneously with power from the motor/generator.

20. A system according to claim 17 wherein the controller is operable to control the electrical heater to heat exhaust in the decomposition reactor in a first mode using power from the energy storage device simultaneously with power from the motor/generator driven by the engine and in a second mode using power from the energy storage device simultaneously with power from the motor/generator driven by regenerative braking.

* * * * *